US011080706B2

(12) United States Patent
Biegun et al.

(10) Patent No.: US 11,080,706 B2
(45) Date of Patent: Aug. 3, 2021

(54) BLOCKING FRAUDULENT TRANSACTIONS IN AN NFC DEVICE

(71) Applicant: INTERNATIONAL BUSINESS MACHINES CORPORATION, Armonk, NY (US)

(72) Inventors: Arkadiusz W. Biegun, Wola Radziszowska (PL); Tomasz D. Chmielecki, Zielonki (PL); Bartlomiej T. Malecki, Slomniki (PL); Konrad K. Skibski, Zielonki (PL)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 15/063,205

(22) Filed: Mar. 7, 2016

(65) Prior Publication Data
US 2017/0255938 A1 Sep. 7, 2017

(51) Int. Cl.
G06Q 20/40 (2012.01)
G06Q 20/32 (2012.01)
G16Y 20/40 (2020.01)

(52) U.S. Cl.
CPC ..... *G06Q 20/4016* (2013.01); *G06Q 20/3278* (2013.01); *G16Y 20/40* (2020.01); *G06Q 20/4093* (2013.01)

(58) Field of Classification Search
None
See application file for complete search history.

(56) References Cited

U.S. PATENT DOCUMENTS 7,813,822 B1 * 10/2010 Hoffberg ............ G06K 9/00369
381/73.1
7,984,847 B1 * 7/2011 Knouff ................. G07F 19/207
235/379
8,556,168 B1 * 10/2013 Lewis ................. G07F 19/2055
235/379

(Continued)

FOREIGN PATENT DOCUMENTS

EP 2506201 A1 * 10/2012 ....... G06Q 20/40145
EP 2506201 A1 10/2012
(Continued)

OTHER PUBLICATIONS

Sohn et al. Indoor localization using wi-fi based fingerprinting and trilateration techniques for LBS applications. (Year: 2012).*

(Continued)

*Primary Examiner* — El Mehdi Oussir
(74) *Attorney, Agent, or Firm* — L. Jeffrey Kelly

(57) ABSTRACT

The invention relates to an NFC device configured for receiving a request to perform a transaction. In response to receiving the request, sensor data from one or more sensors of the NFC device is fed into a first classifier. The sensor data comprises environment parameters of the NFC device. The first classifier determines if sensor data provided as input to the first classifier were sensed in a transaction-typical environment or in a transaction-atypical environment. In case the first classifier determines that the sensor data is indicative of a transaction-atypical environment, the first classifier blocks the transaction or requests a user to confirm the transaction and blocks the transaction until the confirmation is received.

20 Claims, 6 Drawing Sheets

(56) References Cited

U.S. PATENT DOCUMENTS

| | | | | |
|---|---|---|---|---|
| 8,640,947 B1* | 2/2014 | Lewis | | G07F 19/209 |
| | | | | 235/379 |
| 8,855,556 B2* | 10/2014 | Kitchen | | H04B 5/00 |
| | | | | 455/41.1 |
| 8,978,975 B2 | 3/2015 | Barnett | | |
| 9,355,530 B1* | 5/2016 | Block | | G07F 19/201 |
| 9,367,793 B2* | 6/2016 | Proud | | G06K 19/07762 |
| 9,420,857 B2* | 8/2016 | Proud | | A44C 5/0015 |
| 10,049,361 B2* | 8/2018 | Kuntagod | | G06Q 20/40145 |
| 2003/0229793 A1* | 12/2003 | McCall | | G07C 9/23 |
| | | | | 713/186 |
| 2005/0189412 A1* | 9/2005 | Hudnut | | G07G 1/0081 |
| | | | | 235/383 |
| 2008/0172340 A1 | 7/2008 | Karlsson | | |
| 2010/0082490 A1 | 4/2010 | Rosenblatt et al. | | |
| 2010/0138037 A1* | 6/2010 | Adelberg | | G06Q 10/087 |
| | | | | 700/241 |
| 2010/0235285 A1* | 9/2010 | Hoffberg | | G06Q 20/401 |
| | | | | 705/75 |
| 2010/0317420 A1* | 12/2010 | Hoffberg | | G07F 17/323 |
| | | | | 463/1 |
| 2012/0116861 A1* | 5/2012 | Dobyns | | G06Q 30/0234 |
| | | | | 705/14.34 |
| 2012/0150601 A1* | 6/2012 | Fisher | | H04W 4/21 |
| | | | | 705/14.23 |
| 2012/0160912 A1* | 6/2012 | Laracey | | G07F 19/20 |
| | | | | 235/379 |
| 2012/0312870 A1* | 12/2012 | Ma | | G07F 19/206 |
| | | | | 235/379 |
| 2013/0006847 A1* | 1/2013 | Hammad | | G06Q 20/20 |
| | | | | 705/39 |
| 2013/0073448 A1* | 3/2013 | Wall | | G06Q 20/3278 |
| | | | | 705/39 |
| 2013/0198056 A1 | 8/2013 | Aldrey et al. | | |
| 2013/0262305 A1 | 10/2013 | Jones et al. | | |
| 2013/0290234 A1* | 10/2013 | Harris | | G06N 5/022 |
| | | | | 706/46 |
| 2013/0337789 A1* | 12/2013 | Johnson | | H04W 64/00 |
| | | | | 455/414.1 |
| 2014/0207682 A1* | 7/2014 | Wolfond | | G06Q 20/027 |
| | | | | 705/44 |
| 2014/0279503 A1* | 9/2014 | Bertanzetti | | G06Q 20/3221 |
| | | | | 705/44 |
| 2014/0298434 A1* | 10/2014 | Prchal | | H04W 4/026 |
| | | | | 726/7 |
| 2014/0372305 A1* | 12/2014 | Ray | | G07F 19/2055 |
| | | | | 705/44 |
| 2015/0006378 A1* | 1/2015 | Blythe | | G06Q 20/3278 |
| | | | | 705/41 |
| 2015/0073907 A1* | 3/2015 | Purves | | G06F 3/011 |
| | | | | 705/14.58 |
| 2015/0073987 A1* | 3/2015 | Dutt | | G06Q 20/4016 |
| | | | | 705/44 |
| 2015/0097037 A1* | 4/2015 | Narendra | | G06K 19/07345 |
| | | | | 235/488 |
| 2015/0180543 A1* | 6/2015 | Verma | | H04B 5/0031 |
| | | | | 455/41.1 |
| 2015/0220906 A1* | 8/2015 | Jones | | G09G 5/003 |
| | | | | 705/18 |
| 2015/0302411 A1* | 10/2015 | Bondesen | | G06Q 20/20 |
| | | | | 705/72 |
| 2016/0012465 A1* | 1/2016 | Sharp | | G06Q 20/10 |
| | | | | 705/14.17 |
| 2016/0063503 A1* | 3/2016 | Kobres | | G10L 17/005 |
| | | | | 705/18 |
| 2016/0247160 A1* | 8/2016 | Hanna | | G06Q 20/4016 |
| 2016/0321649 A1* | 11/2016 | Dragushan | | G06Q 20/342 |
| 2017/0232300 A1* | 8/2017 | Tran | | G06F 3/017 |
| | | | | 434/247 |
| 2017/0251014 A1* | 8/2017 | Eisen | | G06F 11/3055 |
| 2019/0303551 A1* | 10/2019 | Tussy | | G06K 9/00255 |

FOREIGN PATENT DOCUMENTS

| | | | | |
|---|---|---|---|---|
| WO | WO-2010028805 A1 * | 3/2010 | | G10L 25/48 |
| WO | 2014153462 A2 | 9/2014 | | |
| WO | WO-2014153462 A2 * | 9/2014 | | G06F 21/31 |
| WO | 2015028916 A2 | 3/2015 | | |
| WO | 201513875 A2 | 9/2015 | | |
| WO | 2017153859 A1 | 9/2017 | | |

OTHER PUBLICATIONS

Nor Aida Mahiddin, Noaizan Safie, Elissa Nadia, Suhailan Safei, Engku Fadzli. Indoor Position Detection Using Wifi and Trilateration Technique (Year: 2012).*

Gregory D. Abowd. Ubicomp 2001: Ubiquitous Computing. (Year: 1998).*

Yang, J., Li, Y., & Xie, M. (2015). MotionAuth: Motion-based Authentication for. Retrieved from https://mengjunxie.org/papers/WristSense_2015.pdf (Year: 2015).*

Halevi et al., "Secure Proximity Detection for NFC Devices based on Ambient Sensor Data,"—ESORICS 2012, vol. 7459 of the series Lecture Notes in Computer Science, pp. 379-396.

Fontana, "Audio samples used to secure NFC authentication," ZDNet.com, http://www.zdnet.com/article/audio-samples-used-to-secure-nfc-authentication/, Sep. 19, 2012, Printed on Feb. 3, 2016 pp. 1-7.

Mell et al., "The NIST Definition of Cloud Computing", National Institute of Standards and Technology, Special Publication 800-145, Sep. 2011, pp. 1-7.

International Search Report and Written Opinion, International Application No. PCT/IB2017/051079, dated May 31, 2017, pp. 1-11.

Halevi et al., "Secure Proximity Detection for NFC Devices based on Ambient Sensor Data", Sep. 2012, Conference: European Symposium on Research in Computer Security, 22 pages.

* cited by examiner

BLOCKING FRAUDULENT TRANSACTIONS IN AN NFC DEVICE

BACKGROUND

The present invention relates generally to the field of NFC devices, and more specifically to the blocking of fraudulent transactions whose execution is requested from an NFC device.

Near Field Communication (NFC) is a set of radio technology standards for mobile devices designed to establish radio communication with each other by being brought within a short spatial distance. NFC standards are based on different communications protocols and data exchange formats, and may also include existing radio-frequency identification (RFID) standards such as the ISO/IEC 14443 specific for identification cards, proximity cards and contactless integrated circuit cards. The coverage of various ISO standards ensures global interoperability and the widespread use of NFC devices in different areas. For example, NFC devices are currently used for mobile payment applications via a mobile device, electronic identity verification ("e-passport"), electronic ticketing for transportation, integration of credit cards in mobile devices, data transfer between any types of devices such as digital cameras, mobile phones, media players, P2P (peer to peer) connection between mobile devices, marketing/location-based services, gaming, healthcare monitoring and access control applications.

The NFC standard allows two devices to communicate when they are in close proximity, usually no more than a few centimeters. This "proximity requirement" is a security feature as data exchange via a larger distance between e.g. a user's NFC device and a terminal is prohibited. However, there exist forms of attacks which try to circumvent said security feature. One example for such an attack is the so called "relay attack".

A relay attack is a type of hacking technique related to man-in-the-middle and relay attacks. In a classic relay attack, communication with two communication partners (e.g. an NFC device and a terminal) is initiated by the attacker who then merely relays messages between the two parties without even necessarily manipulating or reading them.

According to the Wikipedia example for a relay attack, employee Peggy works in a high security building that she accesses using a smart card in her purse. When she approaches the door of the building, the building detects the presence of a smart card and initiates an exchange of messages that constitute a zero-knowledge password proof that the card is Peggy's. The building then allows Peggy to enter. Mallory wants to break into the building. Mallory approaches the building with a device that simulates a smart card, and the building responds by initiating the exchange of messages. Mallory forwards the message to her accomplice Evelyn who is tailing Peggy as she runs errands in another part of town. Evelyn relays the message to Peggy's smart card. Peggy's smartcard in her purse receives the message and returns an answer, e.g. an answer comprising user credentials or other data that can be used for authenticating to the building. Evelyn's relaying device listens for the answer, and forwards the answer to Mallory, who relays it to the building. Continuing in this way, Mallory and Evelyn relay messages between the building and Peggy's smart card until the building is satisfied that it is communicating with Peggy's smart card. The building opens and Mallory enters.

SUMMARY

Embodiments of the present invention disclose a computer-implemented method, computer program product, and system for blocking fraudulent transactions including: receiving a request to perform a transaction via an NFC interface of the NFC device; in response to receiving the request, receiving sensor data from one or more sensors of the NFC device, the sensor data comprising environment parameters; providing the sensor data to a first classifier, the first classifier being configured for computing a classification result, the classification result indicating if sensor data provided as input to the first classifier were sensed in a transaction-typical environment or in a transaction-atypical environment; and upon the classification result indicating that the provided sensor data is indicative of a transaction-atypical environment, blocking the transaction or requesting the user to confirm the transaction and blocking the transaction until the user's confirmation is received.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
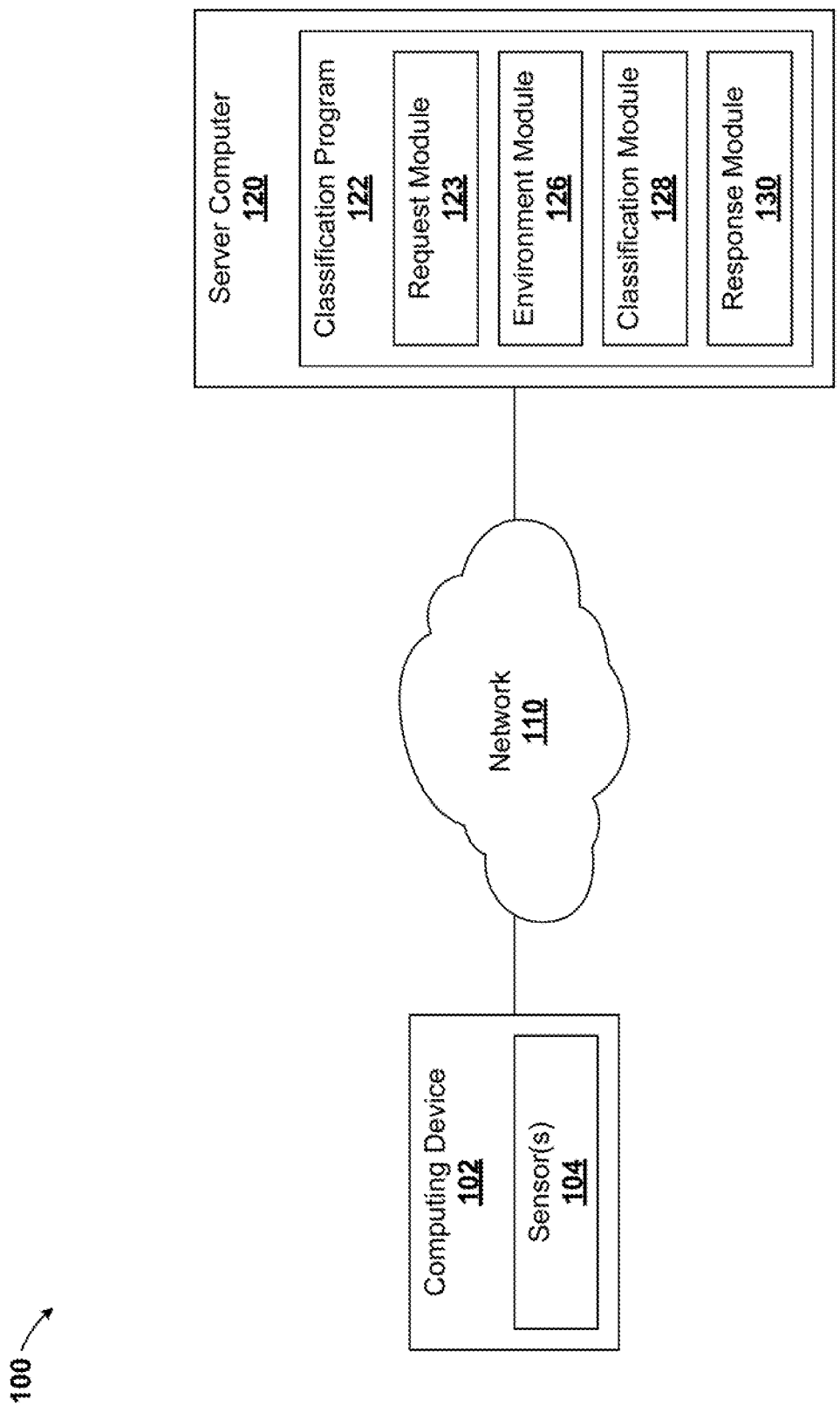
FIG. 1 is a functional block diagram illustrating a computer network environment, according to an exemplary embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention relates generally to the field of NFC devices, and more specifically to the blocking of fraudulent transactions whose execution is requested from an NFC device. Ideally, it may be desirable to have a classifier to compute a classification result that distinguishes between a transaction-typical and a transaction-atypical environment for an NFC device to provide an accurate and immediate determination of whether or not to grant a particular request. The classification result may be based on one or more environment parameters such as, for example, device orientation, acoustic data, GPS positioning, device movement (e.g., acceleration), optical data, environmental history, nearby radio waves and magnetic fields. One way to provide a classification result based on a surrounding environment is to use the sensors installed, for example, on a mobile device. One embodiment by which to determine a transactional request classification is described below referring to the accompanying drawings FIGS. 1-6.

A "classifier" as used herein is a program logic configured to evaluate one or more features of an object to identify which class (or group) it belongs to.

A "transaction" as used herein relates to any kind of individual or indivisible operation that succeeds or fails as a complete unit. For example, the transaction may represent a financial transaction (e.g., transferring money from one bank account to another), a physical process (e.g., opening or closing a door, executing the manufacturing of some goods, or an analysis of biological or chemical samples), or a computational task implemented in the form of a piece of software-based program logic (e.g., a program script, routine, or application). The program logic may relate to, for example, the encryption or decryption of data, granting a user access to confidential data or a particular program module, or the like.

An "NFC device" as used herein is a device equipped with NFC hardware ("NFC interface") having capability to discover and communicate with another NFC entity within a predefined range that is typically shorter than 30 cm, for example, shorter than 10 cm. NFC is a set of short-range wireless technologies, typically requiring a separation of 10 cm or less. NFC typically operates at 13.56 MHz on ISO/IEC 18000-3 air interface and at rates ranging from 106 kbit/s to 424 kbit/s. NFC may involve an initiator and a target; the initiator actively generates an RF field that can power a passive target. This enables NFC targets to take very simple form factors such as unpowered tags, stickers, key fobs, or cards. NFC peer-to-peer communication is possible, provided both devices are powered. NFC standards cover communications protocols and data exchange formats, and are for example based on existing RFID standards including ISO/IEC 14443 and FeliCa. The standards include ISO/IEC 18092 and those defined by the NFC Forum. Preferentially, the NFC device is a mobile, battery powered device, for example, a smartphone or a security token, an electronic document, an electronic passport, an electronic security document, an electronic bank note, or the like. The NFC device may be an authentication token for authenticating to a terminal at the entrance of an access-restricted room or geographic area or for authenticating to a computer system or program logic for performing an access-restricted function. The NFC device may also be a chip card, a smart card, a USB-token with an NFC interface or any other mobile device comprising an NFC interface.

The "environmental parameters" as used herein may be implemented by a developer without any knowledge of a user who will use an application immediately upon installation without a complex training phase. In alternative embodiments, the classification may relate to user-specific properties such as a user's walking or movement patterns (i.e., requiring a training phase). For example, evaluating user-profiles, such as GPS-based movement profiles, in order to determine if the current user should be considered as a trustworthy authorized user (who may perform a requested transaction) or may require an extensive training phase before a classifier may block transactions of a user based on a suspicious movement profile. In addition, as movement-profiles of users show a great variability in dependence on the various tasks a user may perform in the run of a day, user-profile based classifiers may not be as accurate as environmental parameters. Whereby, using environmental parameters as input for a classifier may provide for an accurate and immediately usable method for blocking fraudulent or suspicious transactions.

In particular, embodiments of the invention may protect against relay attacks, for example, by making reference to the example described in the background section, the NFC device of Peggy may be configured to perform the method according to embodiments of the invention. Peggy may still be logged in (be authenticated) to a particular application that is configured to perform a transaction in response to a request so currently there may be no protection from a relay attack by a "standard" authentication scheme. This may happen in case Peggy has forgotten to logout of the application and the application does not comprise a sufficiently prompt timeout based automatic logout mechanism. However, in case the NFC device of Peggy receives a (fraudulent) transaction request, the NFC device may determine, for example, by acoustic data, brightness information or other kinds of sensor data that the NFC device is currently in Peggy's wallet and thus in a transaction-atypical environment. Thus, instead of simply performing the requested action, for example, forwarding sensitive authentication data to the relay device, Peggy's NFC device blocks the requested transaction completely or at least until Peggy enters an explicit confirmation.

FIG. 1, is a functional block diagram of a computer network environment 100, according to an embodiment. More specifically, the computer network environment 100 includes a computing device 102 and a server computer 120 connected through a network 110. It should be appreciated that the figures provide only an illustration of one implementation and do not imply any limitations with regard to the environments in which different embodiments may be implemented. For example, the computer network environment 100 may include multiple computing devices 102, multiple server computers 120, or both. Many modifications to the depicted environments may be made based on design and implementation requirements.

The network 110 can be, for example, a local area network (LAN), a wide area network (WAN) such as the Internet, or a combination of the two, and can include wired, wireless, or fiber optic connections. In general, the network 110 can be any combination of connections and protocols that will support communications between the server computer 120 and the computing device 102.

The server computer 120 may be a mainframe server computer system such as a management server, a web server, or a computing device such as a laptop computer, tablet computer, netbook computer, personal computer (PC), a desktop computer, a personal digital assistant (PDA), a smartphone, a SMS capable phone, or any programmable electronic device capable of communicating with the computing device 102 via the network 110, in accordance with one or more embodiments of the invention. The server computer 120 can also represent a "cloud" of computers interconnected by one or more networks, where the server computer 120 may be a primary server for a computing system utilizing clustered computers when accessed through the network 110.

In an embodiment, the server computer 120 includes a classification program 122, which is a collection of machine readable instructions and data that is used to generate a classification result for a transactional request that distinguishes between a transaction-typical and a transaction-atypical environment for the computing device 102 (e.g., an NFC device). The classification program 122 can generate a classification result and allow or deny the received request using a plurality of modules including a request module 124, an environment module 126, a classification module 128, and a response module 130. The request module 124 receives a transactional request from the computing device 102, such as a money transfer request from one account to another. The environment module 126 receives environmental information regarding environmental parameters from the computing device 102. The classification module 128 determines whether the environmental information is classified as a transaction-typical and a transaction-atypical environment. The response module 130 receives the classification determination from the classification module 128 and can immediately allow or deny the transactional request received from the computing device 102.

The computing device 102 is an NFC device and may be laptop computers, tablet computers, netbook computers, personal computers (PC), desktop computers, personal digital assistants (PDA), smartphones, SMS capable phones, or any programmable electronic device capable of communicating with the server computer 120 via the network 110, in accordance with one or more embodiments of the invention. In an embodiment, the computing device 102 is a smartphone having the sensor(s) 104 including factory installed sensor and may collect and send environmental information to the classification program 122. According to an embodiment, the the sensor(s) 104 may include one or more of: a camera for sensing optical data, for example, image data and/or brightness information, a microphone for sensing acoustic data, for example, environmental noise, an accelerometer for measuring acceleration of the computing device 102, an indoor-position sensor for sensing an indoor position of the computing device 102; the indoor-position sensor may be based on various different technologies (see definition of indoor-system); a gyroscope for sensing the orientation of the computing device 102. It should be mentioned that the list is not exhaustive and other sensor types and corresponding sensor data being indicative of some features being indicative of the type of the current environment may be used.

With reference to brightness information collected by the sensor(s) 104 and sent to the classification program 122, the environment module 126 is configured to identify a sense brightness which is below a brightness threshold as transaction-atypical. For example, this may prevent the performing of a transaction in a situation when the computing device 102 is in a pocket or a wallet or at night. The brightness information may be gathered, for example, by a camera of the computing device 102.

With reference to orientation information collected by the sensor(s) 104 and sent to the classification program 122, the environment module 126 is configured to identify an orientation angle that exceeds an angle threshold as transaction-atypical. Exceeding the angle threshold may indicate an upside-down orientation of the computing device 102. For example, the angle threshold may be chosen such that in case an NFC device is oriented completely or approximately upside-down, the environment is identified as transaction-atypical. For example, in case the user holds his computing device in his hand or in a pocket in an up-side-down orientation while walking or while not using the computing device 102 at all. According to another example, a threshold time and the angle threshold are chosen such that in case the computing device 102 does not change its orientation for a time period that exceeds said time threshold, the environment is also identified as transaction a-typical because normally a user who enters transaction-related data into the computing device 102 will cause at least minor orientation changes.

With reference to acoustic data collected by the sensor(s) 104 and sent to the classification program 122, the environment module 126 is configured to identify a loudness exceeding a loudness threshold value as transaction-atypical. For example, an NFC device is typically not used in a very noisy environment, for example, at a production line or at a large crossroad. In addition or alternatively, the environment module 126 is configured to identify a noise level below a silence threshold value as transaction-atypical. For example, in a typical transaction environment, at least the breathing sounds of the user and/or sounds relating to the handling of computing device 102 should be recorded. If this is not the case this may indicate that the user is currently absent. In addition or alternatively, the environment module 126 is configured to identify acoustic data matching a predefined reference pattern as transaction-atypical.

According to embodiments, the reference pattern is a sound pattern typical for motor traffic or typical for riding a bicycle or typical for a noise generated by an NFC device scrubbing along the inner sides of a wallet or pocket or the inner sides of a handbag or. The rational is that a user currently crossing a busy road or riding a bicycle does typically do not perform any transactions with his NFC device, for example, typically does not authenticate to a terminal or initiate a bank transfer.

With reference to indoor-position collected by the sensor(s) 104 and sent to the classification program 122, the environment module 126 is configured to identify an indoor position indicating an altitude above the floor of a room that is below an altitude threshold as transaction-atypical. For example, in case the indoor position indicates that the computing device 102 is not higher than, for example, 30 cm above the floor of a room or is more than 2 meters above the floor of a room, said position is considered as an indicator of a transaction atypical environment.

An indoor positioning system (IPS) is, for example, a system to locate objects or people inside a building using radio waves, magnetic fields, acoustic signals, or other sensory information collected by mobile devices. The corresponding sensor contained in the NFC device is referred herein as indoor-positioning sensor. There are several commercial systems on the market, but currently there is no standard for an IPS system. IPS systems may use different technologies, including distance measurement to nearby anchor nodes (nodes with known positions, for example, WiFi access points), magnetic positioning, dead reckoning. They either actively locate mobile devices, for example, a mobile NFC device, or provide ambient location or environmental context for devices to get sensed. Many indoor positioning systems are based on trilateration.

With reference to current acceleration of the computing device 102 collected by the sensor(s) 104 and sent to the classification program 122, the environment module 126 is configured to identify a current acceleration of the computing device 102 exceeding an acceleration threshold as transaction-atypical. For example, in case a jogger moving the arm holding the computing device 102 and swinging the computing device 102 heavily back and forward typically would not be using the device for performing a transaction.

According to embodiments, the sensor(s) 104 of the computing device 102 are disabled. For example, the method may comprise automatically disabling each the sensor(s) 104 if it is not actively used by an application running on computing device 102 for longer than a predefined timeout. The method further comprises enabling the sensor(s) 104 selectively in response to the receiving the request or in response to a user command for enabling the sensor for a task unrelated to the requested transaction. For example, in case the task is the transfer of money from one bank account to another, a camera may be activated to sense brightness information although no image data may be required by the banking application for performing the money transfer. Said features may be advantageous as battery power is saved and the battery lifetime is extended.

According to embodiments, the classification module 128 is a rule-based classifier. The rules comprise predefined thresholds and/or predefined reference sound patterns. Examples for said thresholds are the angle threshold, the brightness threshold, the loudness threshold, the silence threshold, the altitude threshold, the acceleration threshold, and other types of thresholds.

For example, the classification module 128 may be implemented as a rule-based/decision tree family (e.g., the Bayes tree classifier). Said types of classifiers are particularly suited as the thresholds can be easily implemented and optionally modified by a user or an automated program logic, thus enabling both a manual as well as automated fine tuning of the thresholds for increasing accuracy.

According to embodiments, the computing device 102, determines that a predefined time interval after the classification module 128 generated a classification result indicating that fed sensor data is indicative of a transaction-atypical environment has elapsed and in addition determines that no confirmation was received from the user during the time interval. Upon determining said transaction-atypical environment and the lapse of the time interval, the computing device 102 outputs an alarm. For example, the alarm may be an acoustic, optic (a warning message displayed on a GUI, a blinking of the display, and/or mechanic alarm (e.g. via a vibration module).

According to embodiments, after the installation of the classification program 122, the computing device 102 uses the classification module 128 for computing, for each of a plurality of received transaction requests, a respective classification result. The computing device 102 stores, for each of the received transaction request, the respectively received sensor data, the first classification result and a flag (e.g. a bit value or a BOOLEAN etc.) in a history. The flag indicates if the user confirmed the requested transaction or not. The history may be, for example, a database managed by a database management system, a file or any other data structure suited for storing data in a structured manner. The history can be stored on any device connected via the network 110.

According to an embodiment, the method comprises refining the classification module 128 by analyzing the history and automatically modifying the classification module 128 such that the refined version of the classification module 128 identifies a smaller number of the transactions that were later confirmed as being requested in an atypical transaction environment. For example, the refinement may be performed by an additional application program, for example, a history analysis module, installed on the computing device 102 or may be performed by a learning module of the classification module 128. For example, the refinement may comprise modifying the thresholds used by the classification module 128 (e.g. the acceleration, loudness, angle and other thresholds) such that the number of erroneously blocked transactions are reduced. For example, a user may commonly perform transactions at a terminal in a very noisy area next to a large crossroads. In this case, the blocking of the transaction is a "false positive" result that should be avoided. The refinement may comprise, for example, performing a fitting or a linear regression analysis for modifying the thresholds such that the number of false positive results is reduced. However, the cost of a misclassification of a fraudulent-request as non-fraudulent request (false negative results) is much higher than the opposite scenario. Thus, the refinement is preferentially performed such that the false positive results are minimized only up to the degree where a false negative result would be generated by the refined classifier based on the data in the history. The refinement is an optional feature and may provide the benefit of a more convenient user experience as erroneous warning messages and transaction blocks are avoided.

According to embodiments, the history further comprising, for each of a plurality of transaction requests, meta data of the transaction request (the metadata is data being descriptive of the request and the requested transaction and may comprise e.g. an IP address, a sender's email address, the time and date of the computing device 102 receiving the transaction request, a text body of the request, the requested type of transaction, etc.). The computing device 102 may include a history analysis module, e.g. a further application program or app installed on the computing device 102 or a sub-module of the classification module 128. The history analysis module analyzes the history for identifying transaction requests for which no confirmation was received and for which the classification module 128 computed a classification result indicating a transaction-atypical environment. Upon the history analysis module identifies a fraudulent attack related pattern in the identified transaction requests, it emits an alarm (e.g. an acoustic, optic or mechanical signal). The alarm, e.g. a warning message displayed on a screen of the computing device 102 may comprise additional information, e.g. elements of the metadata like the IP address or sender address of the requestor, and/or may comprise output data generated by the history analysis module, e.g. the detected type of fraud, a recommendation how to react, and so on.

According to embodiments, the history analysis module is a second classifier (where the classification module 128 is a first classifier). The method comprises: repeatedly using, by the second classifier, the history as a training data set for learning to identify fraudulent transaction request; receiving a further transaction request and metadata related to the further transaction request; in response to receiving the further request, receiving further sensor data from the one or more sensor(s) 104 of the computing device 102, the sensor data comprising environment parameters; feeding the further sensor data into the first classifier, the first classifier being configured for computing a further classification result; analyzing, by the second classifier, the further classification result and the metadata related to the further transaction request, and blocking the transaction and/or outputting an alarm upon determining that the further transaction request is a fraudulent transaction request. This may be advantageous as in some cases, the second classifier may have learned from metadata associated with the true positive, fraudulent requests stored in the history to identify newly received requests as fraudulent even in case it is received in a transaction-typical environment. For example, the second classifier may have learned from the history that all requests received from a particular requestor at a particular time and when the computing device 102 was located in a transaction-atypical environment were not confirmed by the user (true positive results, i.e., fraudulent requests). In the future, the second classifier may block requests from said particular user at said particular time even in case the computing device 102 is then in a transaction-typical environment.

According to embodiments, the method comprises using the first classifier in addition to a password-based and/or biometric data-based authentication logic; blocking, by the authentication logic, the requested transaction for every user not having successfully authenticated to the computing device 102 via a password and/or via biometric data of the user. Thus, the first classifier and optionally also the history analysis module may provide an additional layer of security on top of the standard authentication scheme by which a user is required to authenticate to the application that actually performs the requested transaction. Thus, the accuracy of the first classifier does not have to be perfect in order to increase the security.

Figure 2:
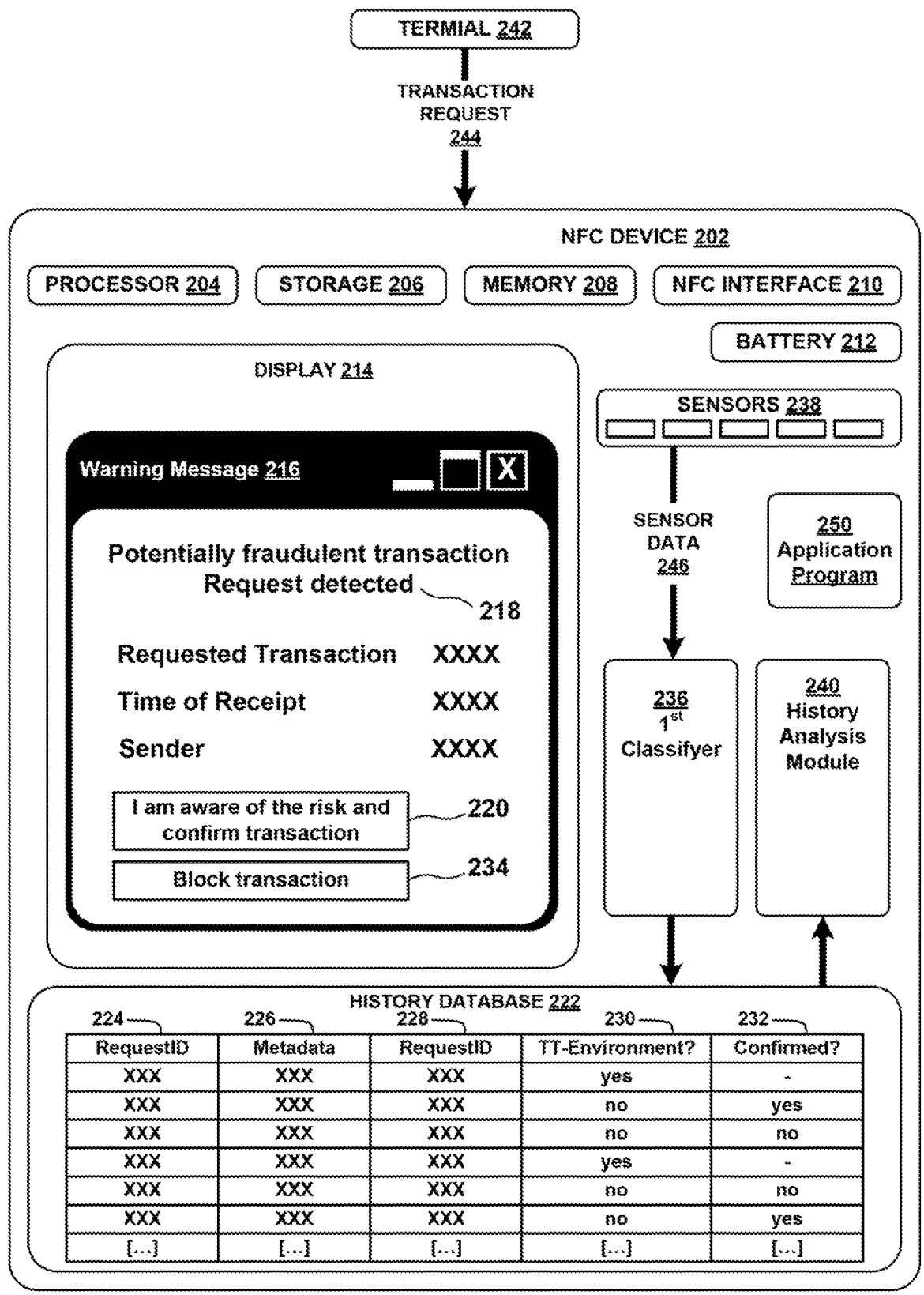
FIG. 2 is a functional block diagram illustrating a system comprising an NFC device and a terminal, according to an exemplary embodiment.

FIG. 2 depicts a system comprising a terminal 242 and an NFC device 202 (e.g., computing device 102 described above with reference to FIG. 1), according to embodiments of the invention. The terminal 242 may be, for example, a point-of-sale (POS) terminal or an NFC-reader of a computer system. The NFC device 202 may be, for example, a mobile, battery powered device comprising an NFC interface 210, e.g. a smartphone or a security token.

The NFC device 202 comprises one or more processors 204 or microprocessors, and a non-transitory storage medium 206 (hereinafter "storage medium 206"), e.g. a flash drive or a hard disc drive, and a main memory 208. The NFC device 202 further comprises a battery 212 and one or more sensors 238, e.g. a camera, a microphone, a gyroscope, an accelerometer and/or an indoor positioning sensor.

The NFC device 202 may have storage instructions installed on it that are configured to be performed by the one or more processors 204. The storage instructions may encode an application program 250 (e.g., the classification program 122 described above with reference to FIG. 1) that is configured for performing a transaction in response to receiving a transaction request 244 via the NFC interface 210. The application program 250 may be configured such that the requested transaction is only performed in case a user to which the NFC device 202 is assigned has successfully authenticated to the NFC device 202, the application program 250, or both. In addition, a first classifier 236 and optionally also a history analysis module 240 may be installed on the storage medium 206. According to embodiments, the NFC device 202 comprises at least one interface via which an alarm message to the user can be output, e.g. a display 214 for displaying graphical warning messages.

The NFC device 202 is configured for receiving a request for a particular transaction, e.g. for performing a bank transfer, via the NFC interface 210. In case of a "normal" request, the request is received from a trustworthy communication partner, e.g. the computer system of a merchant. In case of a relay attack, the request may be received from a relay device of an attacker via the NFC interface 210. The request is forwarded from the NFC interface 210 to the application program 250 configured to perform the requested transaction. The application program 250 may be a banking application. In addition, the first classifier 236 is notified, e.g. by the application program 250, the NFC interface 210 or by another component of the NFC device 202 that a request was received.

In response to receiving the request, the first classifier 236 triggers the one or more sensors 238 to collect sensor data 246 and receive the collected sensor data (e.g. brightness information from a camera, acoustic data from a microphone, NFC device orientation angle from a gyroscope and so on). The sensor data 246 comprises environmental parameters. In some embodiments, the sensor data 246 may be computationally processed by the respective sensor, by the first classifier 236 or another program logic to extract an environmental parameter from the sensor data 246. For example, the brightness may be computed from image data by computing the average RGB intensity values of all pixels of an image taken in response to the request.

The sensor data 246, including the environmental parameters, is received by the first classifier 236 as input. The first classifier 236 computes a classification result by analyzing the sensor data fed into the classifier as input. The classification result indicates if sensor data 246 provided as input to the first classifier 236 was sensed in a transaction-typical environment or in a transaction-atypical environment. In case the classification result indicates that the fed sensor data 246 is indicative of a transaction-atypical environment, the NFC device 202 blocks the requested transaction or prompts the user to confirm the transaction. The requested transaction is blocked until the NFC device 202 receives a confirmation from the user that the requested transaction is safe and can be executed. To "block" a transaction means that the transaction is not executed. The transaction may be saved until a final decision is made whether the transaction should be executed or completely discarded ("finally blocked"). The blocking may be performed by the first classifier 236 or by another piece of program logic controlled by the first classifier 236. The first classifier may for example block the application program 250 from further processing the requested transaction. Alternatively, the first classifier 236 may close a data communication connection between the NFC device 202 and another device via which the transaction shall be performed.

For example, in case the first classifier determines that the request was received at a moment when the NFC device was in a transaction-atypical environment, e.g. in the wallet of a user, the first classifier triggers the displaying of a warning message 216 on the display of the NFC device. The warning message 216 may comprise some metadata 218, e.g. the sender, the time of receipt of the request and the type of requested transaction. In case the user is of the opinion that the requested transaction can be trusted, he or she may confirm the requested transaction by selecting GUI element 220, e.g. a button. In case the user does not confirm within a predefined timeout of e.g. 1 minute or in case the user selects GUI element 234, e.g. a button, the requested transaction is finally blocked.

Irrespective of the user confirming the requested transaction or not, the requested transaction, the request ID 224, related metadata 226, the respectively received sensor data 228, the classification result 230 output by the first classifier (transaction-typical or atypical environment?) and a flag 232 indicating if a confirmation of the user was received is stored in a history, e.g. a history database 222. The database may be stored in the storage medium 206 or may be otherwise operatively coupled to the NFC device.

The history analysis module 240 may be implemented as a classifier referred herein also as "second classifier". The second classifier may be a machine learning classifier being based e.g. on a neural network, on classification rules, on linear regression for "learning", based on the information stored in the history database 222 (which also includes metadata of the requests) which of the request shall be considered fraudulent or not.

For example, the NFC device 202 may receive a new request for a bank account transaction to be performed by application program 250. The request is received from a sender whose requests have been blocked multiple times previously by the first classifier 236 as the requests were received at a time when the NFC device 202 was in a transaction-atypical environment. None of the requests were confirmed by the user and the history database 222 may include metadata, e.g. the IP address of the sender and the decision of the first classifier in respect to the environment being transaction atypical and the decision of the user not to confirm to the requests. Currently, when the NFC device 202 receives the new request by the "fraudulent" sender, the NFC device 202 may actually be in a transaction-typical environment, e.g. because the user tries to authenticate at a terminal (e.g. for performing a transaction that has nothing to do with a bank transfer and that may be performed by a different application of the NFC device (not shown)). Thus, the first classifier 236 may not block this new request because the NFC device 202 is currently in a transaction-typical environment. However, the second classifier may have learned from the history database 222 and in particular from the metadata features which are indicative of a fraudulent request, e.g. a particular IP address. In case the second classifier determines that the new request is a fraudulent transaction request, the second classifier may block the transaction and/or output a warning message and block the requested transaction until a user has confirmed that the transaction request was in fact valid and not fraudulent.

Figure 3:
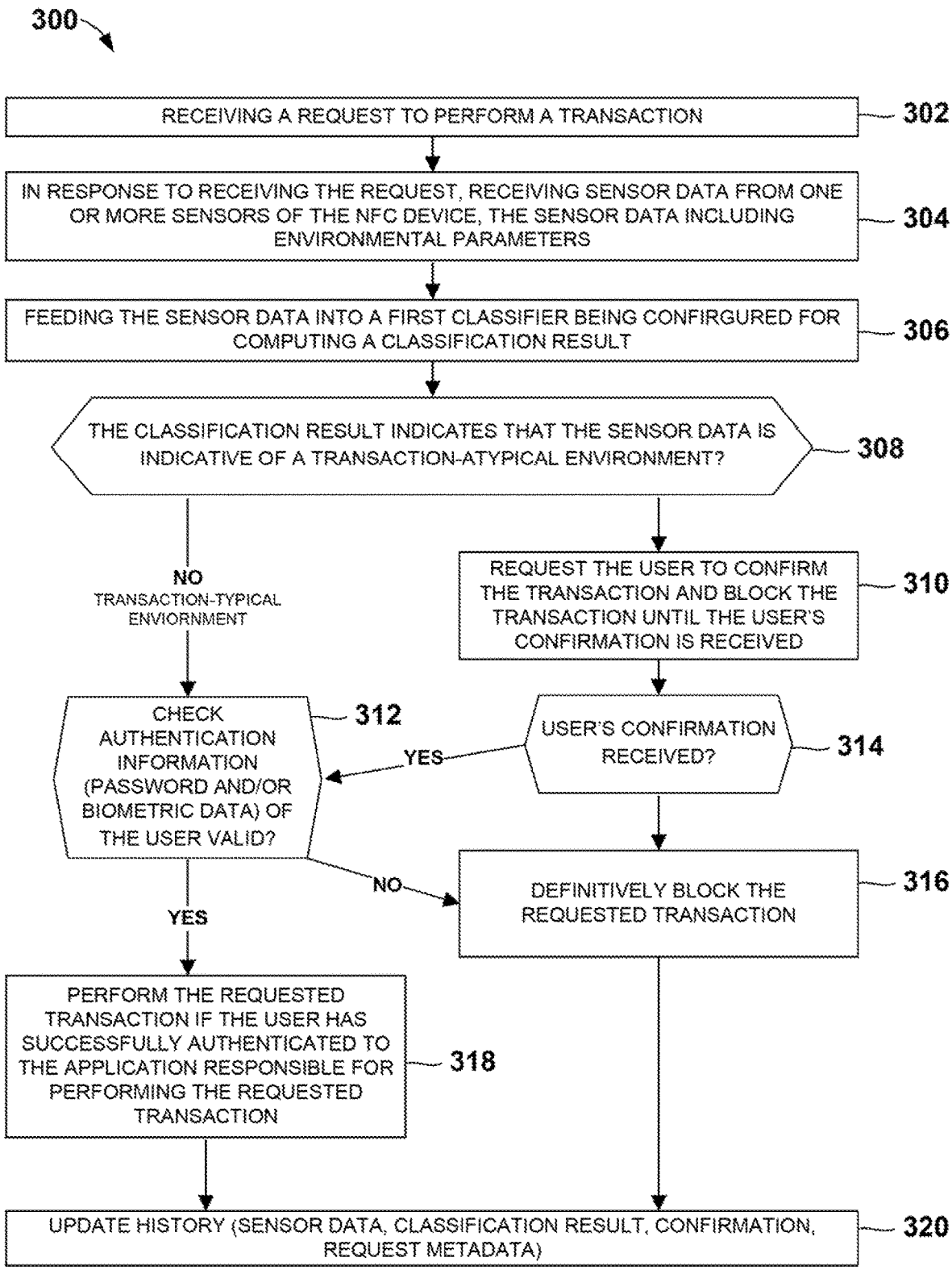
FIG. 3 is a flowchart depicting a method for blocking fraudulent transaction requests, according to an exemplary embodiment.

FIG. 3 depicts a flow chart of a computer-implemented method 300 for blocking fraudulent transactions. The method 300 is performed by the one or more processors 204 of the NFC device 202 as described above with reference to FIG. 2. In step 302, the NFC device 202 receives a request to perform a transaction. In response to receiving the request, the one or more processors 204 in step 304 receive sensor data from the one or more sensors 238 of the NFC device. The sensor data comprise environment parameters such as sound data, image data, acceleration data or the like. In step 306, the processor(s) feed the received sensor data as input data into a first classifier 236. The first classifier is configured for computing a classification result that indicates if sensor data provided as input to the first classifier were sensed in a transaction-typical environment or in a transaction-atypical environment. In step 308 the first classifier determines if the classification result indicates that the fed sensor data is indicative of a transaction-atypical environment.

If so, the first classifier or an application program controlled by the first classifier in step 310 blocks the transaction and requests the user to confirm the transaction and blocking the transaction until the user's confirmation is received. In step 314 the first classifier or a program controlled by the first classifier checks if a user's confirmation was received. If the user's confirmation was not received within a predefined time interval after the receipt of the request, the NFC device definitively blocks, i.e., terminates, the requested transaction in step 316.

In case in step 308 a transaction-typical environment is identified and output as a result by the first classifier, the application 250 requested to perform the transaction (or the NFC device) checks in step 312 if the user to which the NFC device is assigned has successfully authenticated to the application 250 (or the NFC device). If NO, the method 300 proceeds to step 316 and the requested transaction is finally blocked and terminated. IF YES, the method 300 proceeds to step 318 where application program 250 performs the requested transaction provided that the user has successfully authenticated to the application responsible for performing the requested transaction (or to the NFC device). The authentication may require the user to enter his or her password or PIN or biometric data and may be performed before or after the transaction request was received.

In any case, in step 320 the history database 222 is updated by storing for the transaction request—irrespective of whether the request is executed or not—a new data record. The new data record comprises the sensor data received in response to the request, the result output by the first classifier in response to the request, a flag indicating of whether the user confirmed the requested transaction or not and metadata relating to the request or requested transaction.

Figure 4:
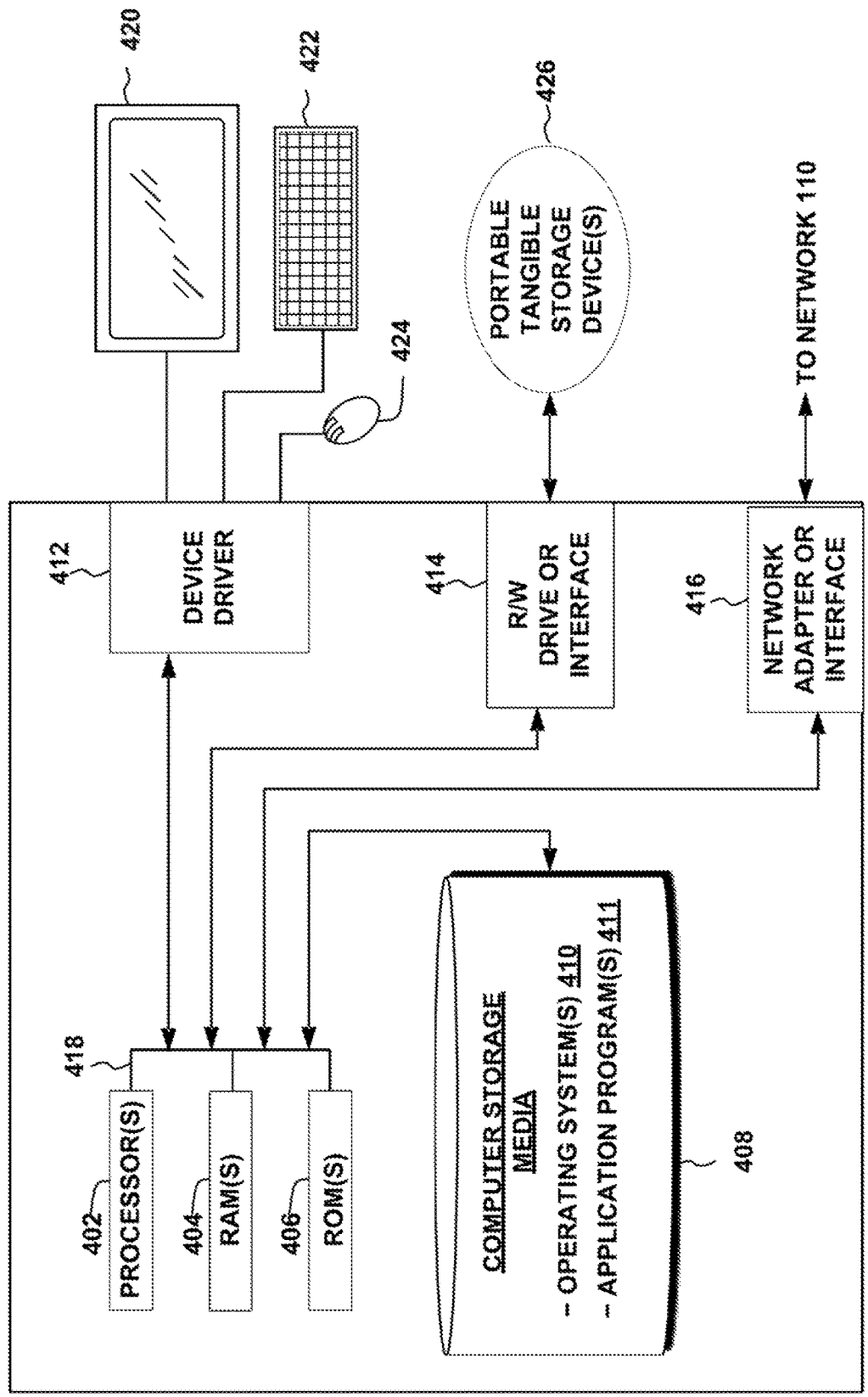
FIG. 4 is a block diagram of components of the an NFC device or server executing a program for blocking fraudulent transaction request, according to an exemplary embodiment.

FIG. 4 is a block diagram of an alternative embodiment of components of the server computer 120 and/or computing device 102, according to an embodiment.

Computing device 102 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, the classification program 122 described above with reference to FIG. 1, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 102 may also include a R/W drive or interface 414 to read from and write to one or more portable computer readable storage media 426. Application programs 411 on computing device 102 may be stored on one or more of the portable computer readable storage media 426, read via the respective R/W drive or interface 414 and loaded into the respective computer readable storage media 408.

Computing device 102 may also include a network adapter or interface 416, such as a TCP/IP adapter card or wireless communication adapter (such as a 4G wireless communication adapter using OFDMA technology). Application programs 411 on computing device 102 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Computing device 102 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
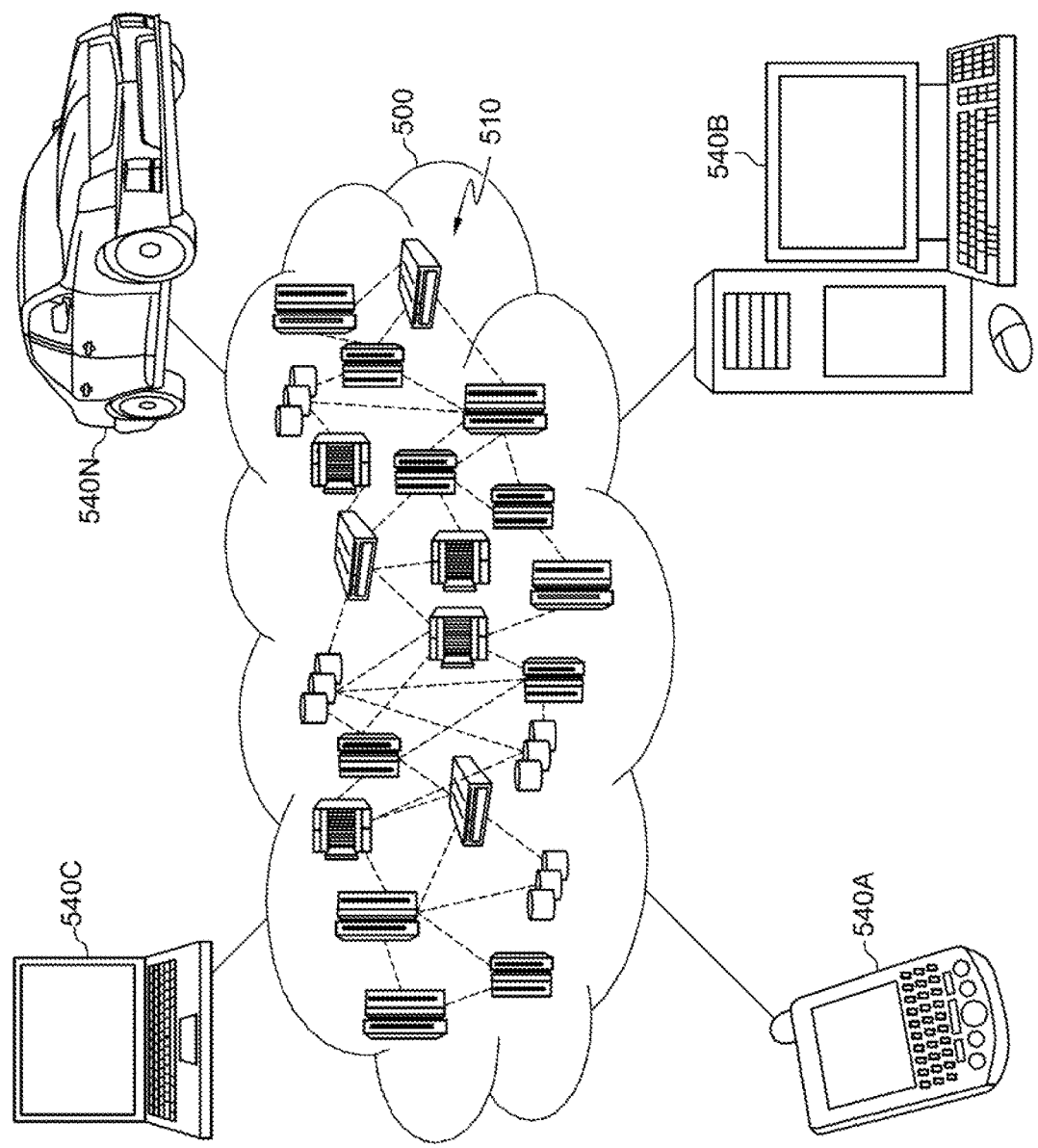
FIG. 5 depicts a cloud computing environment, according to an exemplary embodiment.

Referring now to FIG. 5, an illustration of a cloud computing environment is depicted, according to an exemplary embodiment. The cloud computing environment can include one or more cloud computing nodes 510 with which local computing devices used by cloud consumers, such as, for example, personal digital assistant (PDA) or cellular telephone 540A, desktop computer 540B, and/or laptop computer 540C may communicate. The nodes may be grouped (not shown) physically or virtually, in one or more networks, such as Private, Community, Public, or Hybrid clouds as described hereinabove, or a combination thereof. This allows the cloud computing environment to offer infrastructure, platforms and/or software as services for which a cloud consumer does not need to maintain resources on a local computing device. It is understood that the types of computing devices 540A-C are intended to be illustrative only and that computing nodes and the cloud computing environment can communicate with any type of computerized device over any type of network and/or network addressable connection (e.g., using a web browser).

Figure 6:
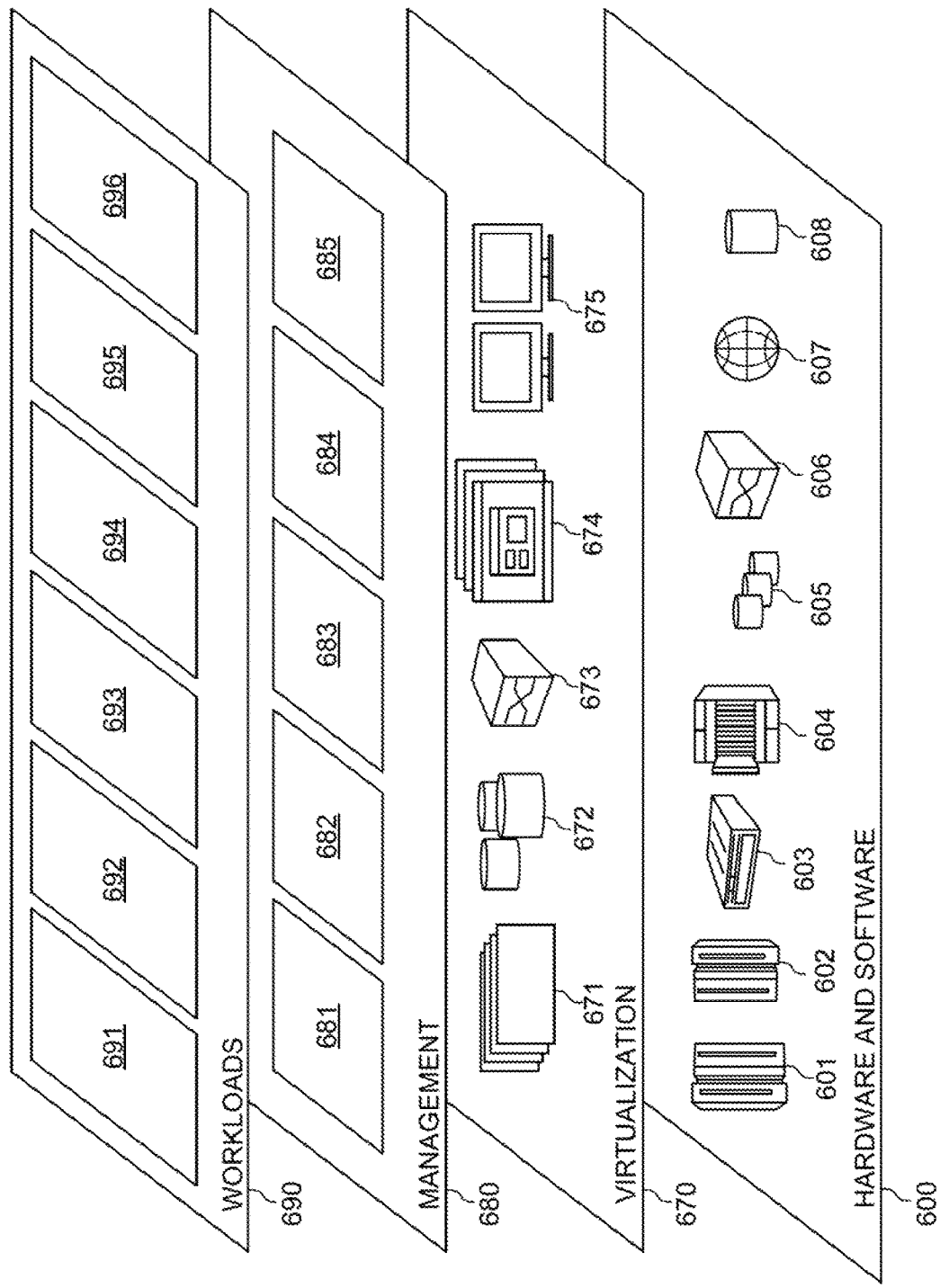
FIG. 6 depicts abstract model layers of a cloud computing environment, according to an exemplary embodiment.

Referring now to FIG. 6, a set of functional abstraction layers provided by cloud computing environment (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include: mainframes 601; RISC (Reduced Instruction Set Computer) architecture based servers 602; servers 603; blade servers 604; storage devices 605; and networks and networking components 606. In some embodiments, software components include network application server software 607 and database software 608.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and classification processing 696 (e.g., the classification program 122 as described above with reference to FIG. 1).

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for blocking fraudulent transactions, the method being performed by a processor of a mobile device assigned to a user, the method comprising:
   receiving one or more requests to perform a transaction via the mobile device;
   receiving sensor data from sensors of the mobile device in response to receiving the one or more requests to perform a transaction via the mobile device, the sensor data comprising brightness data of the environment surrounding the mobile device, acoustic data of the environment surrounding the mobile device, angle data for the mobile device, height data for the mobile device, and acceleration data for the mobile device;
   determining a transaction environment for the mobile device by comparing the brightness data to a predetermined brightness threshold, comparing the acoustic data to a predetermined reference pattern, comparing the angle data to a predetermined angle threshold, comparing the height data to a predetermined height threshold, and comparing the acceleration data to a predetermined acceleration threshold;
   classifying the transaction environment is an atypical transaction environment based on the brightness data being below the predetermined brightness threshold, the acoustic data matching the predetermined reference pattern, the angle data exceeding the predetermined angle threshold, the height data being exceeding the predetermined height threshold, and the acceleration exceeding the predetermined acceleration threshold;
   blocking the transaction in response to determining the transaction environment is the atypical transaction environment; and
   prompting the user to confirm the transaction, wherein the transaction remains blocked until a confirmation is received from the user.

2. The computer implemented method of claim 1, further comprising:
   storing, for each of the received one or more transaction requests, the respectively received sensor data, the classified transaction environment and a flag in a history, the flag indicating if the user confirmed the one or more requested transactions or not;
   analyzing the history to identify a fraudulent attack related pattern based on the received one or more transaction requests for which the transaction environment was classified as the atypical transaction environment and which no confirmation was received from the user; and
   emitting an alarm in response to identifying the fraudulent attack related pattern in the history.

3. The computer implemented method of claim 1, further comprising:
   absent confirmation from the user within a predefined time interval measured from when the transaction environment was classified as the atypical transaction environment, outputting an alarm.

4. The computer implemented method of claim 1, wherein the angle of the mobile device associated with an orientation of the mobile device exceeds the predetermined angle threshold when the mobile device is oriented upside down.

5. The computer implemented method of claim 1, wherein a relative height of the mobile device above the floor is below the predetermined height threshold when the mobile device is below approximately 30 cm.

6. The computer implemented method of claim 1, wherein the reference pattern being a sound pattern typical for motor traffic, a sound pattern typical for riding a bicycle, or a sound pattern typical for a noise generated by the mobile device scrubbing along the inner sides of a wallet or pocket or of a handbag.

7. The computer implemented method of claim 1, wherein the sensors of the mobile device comprise one or more of a camera, a microphone, an accelerometer, an indoor position sensor, and a gyroscope.

8. A computer system for blocking fraudulent transactions, the computer system comprising:
  one or more computer processors of a mobile device assigned to a user;
  one or more computer-readable storage media; and
  program instructions stored on the one or more computer-readable storage media which when executed by the one or more computer processors, cause the one or more computer processors to:
    receive sensor data from sensors of the mobile device in response to receiving one or more requests to perform a transaction via the mobile device, the sensor data comprising brightness data of the environment surrounding the mobile device, acoustic data of the environment surrounding the mobile device, angle data for the mobile device, height data for the mobile device, and acceleration data for the mobile device;
    determine a transaction environment for the mobile device by comparing the brightness data to a predetermined brightness threshold, comparing the acoustic data to a predetermined reference pattern, comparing the angle data to a predetermined angle threshold, comparing the height data to a predetermined height threshold, and comparing the acceleration data to a predetermined acceleration threshold;
    classifying the transaction environment is an atypical transaction environment based on the brightness data being below the predetermined brightness threshold, the acoustic data matching the predetermined reference pattern, the angle data exceeding the predetermined angle threshold, the height data being exceeding the predetermined height threshold, and the acceleration exceeding the predetermined acceleration threshold;
    block the transaction in response to determining the transaction environment is the atypical transaction environment; and
    request the user to confirm the transaction, wherein the transaction remains blocked until a confirmation is received from the user.

9. The computer system of claim 8, further comprising:
  store, for each of the received one or more transaction requests, the respectively received sensor data, the classified transaction environment and a flag in a history, the flag indicating if the user confirmed the one or more requested transactions or not;
  analyze the history to identify a fraudulent attack related pattern based on the received one or more transaction requests for which the transaction environment was classified as the atypical transaction environment and which no confirmation was received from the user; and
  emit an alarm in response to identifying the fraudulent attack related pattern in the history.

10. The computer system of claim 8, further comprising:
  absent confirmation from the user within a predefined time interval measured from when the transaction environment was classified as the atypical transaction environment, output an alarm.

11. The computer system of claim 8, wherein the angle of the mobile device associated with an orientation of the mobile device exceeds the predetermined angle threshold when the mobile device is oriented upside down.

12. The computer system of claim 8, wherein a relative height of the mobile device above the floor is below the predetermined height threshold when the mobile device is below approximately 30 cm.

13. The computer system of claim 8, wherein the reference pattern being a sound pattern typical for motor traffic, a sound pattern typical for riding a bicycle, or a sound pattern typical for a noise generated by the mobile device scrubbing along the inner sides of a wallet or pocket or of a handbag.

14. The computer system of claim 8, wherein the sensors of the mobile device comprise one or more of a camera, a microphone, an accelerometer, an indoor position sensor, and a gyroscope.

15. A computer program product for blocking fraudulent transactions, the computer program product comprising:
  one or more computer-readable storage media of a mobile device assigned to a user; and
  program instructions stored on the one or more computer-readable storage media which when executed by a processor, cause the processor to:
    receive sensor data from sensors of the mobile device in response to receiving one or more requests to perform a transaction via the mobile device, the sensor data comprising brightness data of the environment surrounding the mobile device, acoustic data of the environment surrounding the mobile device, angle data for the mobile device, height data for the mobile device, and acceleration data for the mobile device;
    determine a transaction environment for the mobile device by comparing the brightness data to a predetermined brightness threshold, comparing the acoustic data to a predetermined reference pattern, comparing the angle data to a predetermined angle threshold, comparing the height data to a predetermined height threshold, and comparing the acceleration data to a predetermined acceleration threshold;
    classifying the transaction environment is an atypical transaction environment based on the brightness data being below the predetermined brightness threshold, the acoustic data matching the predetermined reference pattern, the angle data exceeding the predetermined angle threshold, the height data being exceeding the predetermined height threshold, and the acceleration exceeding the predetermined acceleration threshold;
    block the transaction in response to determining the transaction environment is the atypical transaction environment; and
    request the user to confirm the transaction, wherein the transaction remains blocked until a confirmation is received from the user.

16. The computer program product of claim 15, further comprising:
  store, for each of the received one or more transaction requests, the respectively received sensor data, the classified transaction environment and a flag in a history, the flag indicating if the user confirmed the one or more requested transactions or not;
  analyze the history to identify a fraudulent attack related pattern based on the received one or more transaction requests for which the transaction environment was classified as the atypical transaction environment and which no confirmation was received from the user; and emit an alarm in response to identifying the fraudulent attack related pattern in the history.

17. The computer program product of claim 15, further comprising:

absent confirmation from the user within a predefined time interval measured from when the transaction environment was classified as the atypical transaction environment, output an alarm.

18. The computer program product of claim 15, wherein the angle of the mobile device associated with an orientation of the mobile device exceeds the predetermined angle threshold when the mobile device is oriented upside down.

19. The computer program product of claim 15, wherein a relative height of the mobile device above the floor is below the predetermined height threshold when the mobile device is below approximately 30 cm.

20. The computer program product of claim 15, wherein the reference pattern being a sound pattern typical for motor traffic, a sound pattern typical for riding a bicycle, or a sound pattern typical for a noise generated by the mobile device scrubbing along the inner sides of a wallet or pocket or of a handbag.

* * * * *